(12) United States Patent
Rogers

(10) Patent No.: US 6,582,113 B2
(45) Date of Patent: *Jun. 24, 2003

(54) OLEOPHOBIC LAMINATED ARTICLES, ASSEMBLIES OF USE, AND METHODS

(75) Inventor: Robert M. Rogers, Minnetonka, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 33 days.

This patent is subject to a terminal disclaimer.

(21) Appl. No.: 09/799,300

(22) Filed: Mar. 5, 2001

(65) Prior Publication Data

US 2002/0004107 A1 Jan. 10, 2002

Related U.S. Application Data

(63) Continuation of application No. 09/078,885, filed on May 14, 1998, now Pat. No. 6,196,708.

(51) Int. Cl.[7] .......................... B60Q 1/04; B01D 71/36; B05D 5/00; B32B 3/12; B32B 7/12

(52) U.S. Cl. .................. 362/547; 210/500.36; 427/244; 427/393.5; 428/316.6; 428/317.1; 442/30; 442/40

(58) Field of Search .......................... 428/316.6, 318.4, 428/319.7, 319.9, 317.1, 393.5; 427/244, 421, 393.5; 442/30, 40, 45, 46, 47; 210/500.36; 362/46, 475, 480, 507, 547

(56) References Cited

U.S. PATENT DOCUMENTS

| | | | |
|---|---|---|---|
| 3,341,497 A | | 9/1967 | Sherman et al. |
| 3,358,063 A | * | 12/1967 | Wiggins et al. ...... 427/393.5 X |
| 3,384,627 A | | 5/1968 | Anello et al. |
| 3,645,990 A | | 2/1972 | Reynolds |
| 3,692,569 A | * | 9/1972 | Grot ........................ 428/319.7 |
| 3,818,074 A | | 6/1974 | Ahlbrecht |
| 3,940,359 A | | 2/1976 | Chambers |
| 4,566,981 A | | 1/1986 | Howells ................. 524/225 X |
| 4,668,726 A | | 5/1987 | Howells ...................... 524/225 |
| 4,722,904 A | | 2/1988 | Feil ............................. 436/11 |
| 4,864,006 A | | 9/1989 | Giannetti et al. ............ 526/209 |
| 4,914,146 A | | 4/1990 | Honda et al. ................ 524/449 |
| 4,975,468 A | | 12/1990 | Yiv ............................. 514/759 |
| 4,985,282 A | | 1/1991 | Moggi et al. ............... 96/13 |
| 5,077,097 A | | 12/1991 | Moggi et al. ............ 427/393.6 |
| 5,116,650 A | * | 5/1992 | Bowser ............... 428/319.7 X |
| 5,151,217 A | | 9/1992 | Price ..................... 524/801 X |
| 5,209,850 A | * | 5/1993 | Abayasekara et al. . 210/500.36 |
| 5,234,807 A | | 8/1993 | Texter et al. ................ 430/627 |
| 5,342,434 A | | 8/1994 | Wu ............................... 96/13 |
| 5,376,441 A | | 12/1994 | Wu et al. ................. 428/304.4 |
| 5,417,743 A | | 5/1995 | Dauber ......................... 96/13 |
| 5,460,872 A | | 10/1995 | Wu et al. ................. 428/304.4 |
| 5,539,047 A | | 7/1996 | Wu et al. .................... 524/805 |
| 5,539,072 A | | 7/1996 | Wu ............................. 526/304 |
| 5,614,284 A | * | 3/1997 | Kranzler et al. ..... 428/319.7 X |
| 5,620,669 A | * | 4/1997 | Plinke et al. ............. 442/40 X |
| 5,642,935 A | * | 7/1997 | Schmitt ................. 362/547 X |
| 5,677,031 A | * | 10/1997 | Allan et al. .......... 428/318.4 X |
| 5,876,487 A | | 3/1999 | Dahlgren et al. ............... 96/13 |
| 6,196,708 B1 | * | 3/2001 | Rogers ........................ 362/547 |
| 6,273,271 B1 | * | 8/2001 | Moya ............... 210/500.36 X |
| 6,354,443 B1 | * | 3/2002 | Moya ................ 210/500.36 X |
| 6,410,084 B1 | * | 6/2002 | Klare et al. ................. 427/244 |

FOREIGN PATENT DOCUMENTS

| | | | |
|---|---|---|---|
| DE | 42 34 919 A1 | 4/1994 | |
| EP | 0 182 516 | 5/1986 | |
| EP | 0 193 963 | 9/1986 | |
| EP | 0 280 312 | 8/1988 | |
| EP | 0 315 078 | 5/1989 | |
| EP | 0 315 841 | 5/1989 | |
| EP | 0 414 155 A1 | 2/1991 | |
| EP | 0 572 269 A1 | 12/1993 | |
| EP | 0 576 343 A2 | 12/1993 | |
| EP | 0 641 594 A1 | 3/1995 | |
| EP | 0 829 514 A2 | 3/1998 | |
| GB | 2 242 512 | 10/1991 | |
| JP | 63-296939 | 12/1988 | .............. 428/304.4 |
| JP | 63-296940 | 12/1988 | .............. 428/304.4 |
| JP | 3-109410 | 5/1991 | |
| SU | 1237673 | 6/1986 | |
| WO | WO 91/01791 | 2/1991 | |
| WO | WO 92/21715 | 12/1992 | |
| WO | WO 93/08019 | 4/1993 | |
| WO | WO 97/49552 | 12/1997 | |
| WO | WO 98/31966 | 7/1998 | |

OTHER PUBLICATIONS

3M Brand Product Bulletin, "Protective Chemical FC–3537", 5 pgs. (Oct. 1991).
3M Material Safety Data Sheet—FC–3537 Brand Protector, pp. 1–7 (1996).
3M Brand Product Bulletin, "Protective Chemical FC–824", 7 pgs. (Feb. 1995).
3M Material Safety Data Sheet—FC–824 Protective Chemical, pp. 1–6 (1996).
Full, A. et al., "Polymerization of Tetrahydrofurfuryl Methacrylate in Three–Component Anionic Microemulsions", *Macromolecules*, 25(20):5157–5164 (1992).
"Air resistance of paper (Gurley method)", TAPPI test T 460 om–96 (1996).
"Oil Repellency: Hydrocarbon Resistance Test", AATCC Test Method 118–1992 (1996).
3M Brand Product Bulletin, "Fabric & Leather Protector FC–3537", pp. 1–2 (May 1993).

* cited by examiner

Primary Examiner—Richard D. Lovering
(74) Attorney, Agent, or Firm—Merchant & Gould P.C.

(57) ABSTRACT

An article, such as a filter or film, has a treated laminate with an expanded PTFE membrane and a porous support scrim. The treated laminate is formed by contacting a laminate having an expanded PTFE membrane and a porous support scrim with an oleophobic treatment agent dissolved in an organic solvent. The oleophobic treatment agent is deposited onto the expanded PTFE membrane and porous support scrim as the organic solvent is removed. The oleophobic treatment agent is typically a fluoropolymer. The article can be used, for example, as a filter over a port in a housing of an electronics or other device.

20 Claims, 2 Drawing Sheets

OLEOPHOBIC LAMINATED ARTICLES, ASSEMBLIES OF USE, AND METHODS

This application is a continuation of application Ser. No. 09/078,885, filed May 14, 1998, now U.S. Pat. No. 6,196,708 which application is incorporated herein by reference.

FIELD OF THE INVENTION

The present invention is, in general, directed to laminated articles including filters and films. More specifically, the invention is directed to a laminated article, such as a filter, having a support scrim, a membrane, and an oleophobic enhancement agent disposed from an organic solvent onto the support scrim and membrane. The invention also concerns assemblies using the laminated articles.

BACKGROUND OF THE INVENTION

Laminated articles have many uses, including, for example, as filters and films. The laminated articles can be formed with a variety of different properties which are often a result of the construction of the laminated articles. For example, appropriate materials and layers can be used in forming the laminated articles to provide the desired properties. Properties of the laminated articles can also be modified by treatments including, for example, chemical treatments. In a number of applications, laminated articles are useful as filters or protective films that allow the flow of air into or through the laminated article while preventing or restricting the flow of particulate matter, water, oil, other organic compounds, and/or other contaminants.

One example of a laminated article is a breather filter that permits the flow of a fluid, such as air, through the filter, but prevents or restricts the flow of particles and other contaminants (e.g., water and/or organic compounds). The filter typically includes one or more porous layers. The average pore size of the porous layer or layers of the filter influences the size of particles that can flow through the filter.

In addition, one or more layers of the filter may be treated with or formed using a material to prevent or resist the flow of selected compounds or contaminants through or into the layer. For example, a layer may be treated with or formed using a hydrophobic material to resist the passage of water through or into that layer. Conversely, the layer may be treated with or formed using a hydrophilic material. Other circumstances call for a layer or layers that are oleophobic or oleophilic.

In some circumstances, there is a need to prevent or restrict the flow of a variety of particles and fluids. For example, filters and films are often used in environments that are sensitive to contaminants with disparate properties, such as particulate matter, water, and oily materials. Such environments may include, for example, storage containers for oily materials and articles used near an engine. The disparate nature of the contaminants often requires the use of a combination of approaches to prevent or restrict the flow of these materials, including, for example, the choice of an appropriate average pore size, the choice of materials for the layers of the laminate article, and the treatment of one or more layers of the laminated article.

SUMMARY OF THE INVENTION

Generally, the present invention relates to laminated articles, methods of making the laminated articles, and assemblies using the laminated articles. One embodiment is an article having a treated laminate with an expanded polytetrafluoroethylene (PTFE) membrane and a porous support scrim. The treated laminate is formed by contacting a laminate having an expanded PTFE membrane and a porous support scrim with an oleophobic treatment agent dissolved in an organic solvent. The oleophobic treatment agent is deposited onto the expanded PTFE membrane and porous support scrim as the organic solvent is removed. A filter may be formed using the treated laminate.

Yet another embodiment is a method of making an article having an oleophobically-treated laminate. A laminate having an expanded PTFE membrane and a porous support scrim is brought into contact with an oleophobic treatment agent dissolved in an organic solvent. The oleophobic treatment agent is deposited onto the expanded PTFE membrane and porous support scrim as the organic solvent is removed.

A further embodiment is an assembly having a housing with a port to permit air flow into and out of the housing. A filter is disposed over the port to prevent or restrict the flow of contaminants. The filter includes a treated laminate with an expanded PTFE membrane and a porous support scrim. The treated laminate is formed by contacting a laminate having an expanded PTFE membrane and a porous support scrim with an oleophobic treatment agent dissolved in an organic solvent. The oleophobic treatment agent is then deposited onto the expanded PTFE membrane and porous support scrim as the organic solvent is removed.

One example of the assembly is a headlamp for a vehicle. The headlamp includes a light source and a housing around the light source. The housing has a port to permit air flow into and out of the housing with the filter having the treated laminate disposed over the port.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
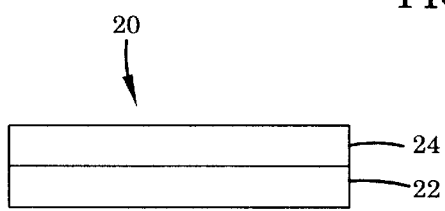
FIG. 1 is a cross-sectional view of one embodiment of a laminated article, according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to laminated articles, methods of forming laminated articles, and assemblies using laminated articles. In particular, the present invention is directed to laminated articles, such as filters and films, that are oleophobic, as well as methods of forming such laminated articles and assemblies using the laminated articles. While the present invention is not so limited, an appreciation of various aspects of the invention will be gained through a discussion of the examples provided below. In particular, the invention is described below in the context of a laminated article used as a filter, however, it will be understood that the invention includes other laminated articles, such as films.

"Oleophobicity" of a laminated article can be rated on a scale of 1 to 8 according to AATCC test 118-1992, incorporated herein by reference. This test evaluates an article's resistance to wetting. Eight standard oils, labeled #1 to #8, are used in the test. The #1 oil is mineral oil (surface tension: 31.5 dynes/cm@25° C.) and the #8 oil is heptane (surface tension: 14.8 dynes/cm@25° C.). Five drops of each rated oil are placed on the laminated article. Failure occurs when wetting of the laminated article by a selected oil occurs within 30 seconds. The oleophobic rating of a laminated article corresponds to the last oil successfully tested. The higher the oleophobic rating, the better the oleophobicity.

An "increase in oleophobicity", as the term is used herein, unless provided otherwise, generally refers to a comparison between a treated laminated article and an untreated laminated article that is otherwise similarly constructed.

Laminated Articles

FIG. 1 illustrates one embodiment of a laminated article 20 of the invention. The laminated article 20 includes a membrane 22 and a support scrim 24 laminated together. An oleophobic enhancement agent is disposed from an organic solvent onto the membrane 22 and the support scrim 24. Typically, the addition of an oleophobic enhancement agent increases oleophobicity of the laminated article 20.

The Membrane

The membrane 22 is a microporous polymeric film to allow the flow of a fluid, such as air, into or through the membrane 22. A preferred polymeric film for use as the membrane 22 includes expanded polytetrafluoroethylene (PTFE) films, as described, for example, in U.S. Pat. Nos. 3,953,566; 4,187,390; 4,945,125; 5,066,683; 5,157,058; and 5,362,553 incorporated herein by reference, or available commercially, for example, as Tetratec #1305 (Tetratec, Philadelphia, Pa.) or Poreflon™ WP-100, Sumitomo Electric Industries, Osaka, Japan. An expanded PTFE film typically comprises a plurality of nodes interconnected by fibrils to form a microporous structure.

Expanded PTFE films for use in air filtering and other applications often have a relatively good air permeability. One measure of the air permeability of the expanded PTFE films is the number of seconds required for the flow of 100 cubic centimeters of air through the film, according to the TAPPI T 460 om-96 test protocol, incorporated herein by reference. Typically, the air permeability of suitable expanded PTFE films is not greater than 20 seconds, as measured using a Gurley densometer, Model No. 4110, Gurley Precision Instruments, Troy, N.Y. Preferably, the air permeability is not greater than about 6 seconds and, more preferably, not greater than about 4 seconds.

Expanded PTFE films are typically hydrophobic. This property of the expanded PTFE films is generally useful in applications where restriction of water or water vapor flow is desired. In many cases, suitable expanded PTFE films have a moisture vapor transmission ratio (MVTR) at 23° C. of, for example, about 1500 g/m$^2$/24 hours or less, as measured according to ASTM E 96-95, incorporated herein by reference, using a Hotpack Temperature and Humidity Oven, Hotpack (Philadelphia, Pa.). Preferably, the MVTR is about 1400 g/m$^2$/24 hours or less and, more preferably, about 1250 g/m$^2$/24 hours or less.

Another measure of water permeability is hydrostatic head (i.e., the pressure required to push water through the film), according to ASTM D 715-95, Sections 37–41, incorporated herein by reference. Typically, the hydrostatic head for expanded PTFE films is no greater than about 1000 kPa (about 150 p.s.i.) and is usually at least 7 kPa (about 1 p.s.i.) In some embodiments, the hydrostatic head ranges from about 7 kPa to about 900 kPa (about 1 to about 130 p.s.i.) and, preferably, from about 70 kPa to about 240 kPa (about 10 to about 35 p.s.i.).

The size of the pores contributes to determining the effective range of particles that can be prevented or restricted from flow through the laminated article 20. Often the average pore size of the membrane 22 is about 2 μm or less. For many filtering applications, the average pore size ranges from about 0.05 μm to about 1.5 μm, preferably, from about 0.2 μm to about 1.0 μm, and, more preferably, from about 0.5 μm to about 0.8 μm. However, larger or smaller average pore sizes may be used.

Another factor in the flow of the fluid through the laminated article is the porosity of the membrane 22, (i.e., the percentage of open space in the volume of the membrane 22, as determined by comparison of the density of the membrane with respect to the density of nonporous PTFE). Typically, the porosity of the membrane 22 is about 20% or greater and about 95% or less. Often the porosity of the membrane 22 of a laminated article suitable for many filtering applications ranges from about 70% to about 95%, preferably from about 80% to about 95%, and more preferably from about 85% to about 95%.

The dimensions (e.g., length, width, or diameter) of the membrane 22 often depend on the use of the laminated article 20. For example, a laminated article 20 used as a breather filter typically covers a port through which a fluid, such as air, flows. The breather filter prevents or restricts the flow of selected particles and/or contaminants (e.g., water and/or organic compounds) through the filter. The size of the breather filter and its components, such as the membrane 22 and support scrim 24, are typically at least as large as the port. An absorbing filter, in which the membrane or another layer absorbs a contaminant, such as water and/or organic compounds, often has dimensions related to the amount of material to be absorbed during the lifetime of the filter. On the other hand, a film may include a membrane formed over a surface areas of a few square millimeters or less to a few square meters or more.

The thickness of the membrane 22 may depend, for example, on the amount of filtering desired, the average pore size of the membrane 22, the expected or desired lifetime of the laminated article 20, the average pore size of other layers in the laminated article 20, and the durability of the membrane 22 or other layer in the laminated article 20. Generally, the thicker the membrane 22, the more restricted the flow of fluid and/or particles through the membrane 22. Thus, for example, the thickness of a membrane in a breather filter may be determined by a balance of a desired rate of mass transport of fluid (e.g., air) across the membrane and a desired amount of filtration of contaminants (e.g., particles, water, and/or oily materials). In some embodiments of the invention, useful, for example, as filters, the thickness of the membrane is 500 µm or less and at least about 0.5 µm. For these embodiments, the thickness of the membrane typically ranges from about 4 µm to about 200 µm, preferably, from about 10 µm to about 150 µm, and, more preferably, from about 25 µm to about 100 µm. However, larger and smaller thicknesses may be used.

The Support Scrim

Some membranes 22, including, for example, many expanded PTFE membranes suitable for filtering applications, are thin and fragile. A support scrim 24 is usually included in the laminated article 20 to provide support to the membrane 22. The support scrim 24 may have other or alternative functions including, for example, restricting or preventing the flow of the same and/or different particles and fluids as the membrane 22 and/or protecting the membrane 22 or other layers in the laminated article from damage. In some embodiments, a support scrim is not needed.

The support scrim 24 is typically formed using a woven or nonwoven porous, polymeric material. Often the support scrim is made using a fibrous material, however, other porous materials may also be used. The average pore size of the support scrim 24 is usually larger than the average pore size of the membrane 22, although this is not necessary in some applications. Thus, in some embodiments, the support scrim 24 acts to at least partially filter the fluid flowing into or through the laminated article. Typically, the average pore size of the support scrim is about 100 µm or less and often at least about 0.5 µm. The average pore size of support scrims suitable for many filtering applications ranges from about 1 µm to about 50 µm, preferably, from about 7 µm to about 35 µm, and, more preferably, from about 10 µm to about 30 µm. The porosity of the support scrim is often about 20% or greater and typically no more than about 90%. The porosity of support scrims suitable for many filtering applications often ranges from about 20% to about 80%, preferably, from about 30% to about 75%, and, more preferably, from about 40% to 70%.

Suitable polymeric materials for the support scrim 24 include, for example, stretched or sintered plastics, such as polyesters, polypropylene, polyethylene, and polyamides (e.g., nylon). Examples of commercially available nonwoven materials for use as a support scrim include Hollytex™ #3257 from Ahlstrom Filtration, Inc. (Mount Holly Springs, Pa.) and Cerex™ #100 from Midwest Filtration Company (Fairfield, Ohio) or Cerex Advanced Fabrics (Pensacola, Fla.). These materials are often available in various weights including, for example, 0.5 oz./sq.yd (about 17 g/m$^2$), 1 oz./sq.yd. (about 34 g/m$^2$), and 2 oz./sq.yd. (about 68 g/m$^2$). Examples of commercially available woven materials for use as a support scrim include a polyester film (Style 604, 150 denier) from Travis Textiles (New York, N.Y.).

Additional examples of support scrim materials are various stretched or sintered polyethylene, polypropylene, and other plastics, including, for example, Exxaire XBF-110W, XBF-116W, BF-303W, and BF-513K2 from Exxon Corp. (Buffalo Grove, Ill.), AP3 materials from Amoco Corp. (Atlanta, Ga.), X-7744 Porex T3 from Porex Technologies Corp. (Fairburn, Ga.), and BR-300 from Clopay Building Products Co., Inc. (Cincinnati, Ohio). These same materials may also be used, in some embodiments, as a membrane instead of or in addition to the expanded PTFE membrane.

Lamination

The support scrim 24 and the membrane 22 are laminated together. The lamination of the support scrim 24 and the membrane 22 can be accomplished by a variety of methods including, for example, heat lamination and adhesive lamination. FIG. 1 illustrates one embodiment of a laminated article in which the support scrim 24 and membrane 22 are adhered by heat lamination.

Figure 2:
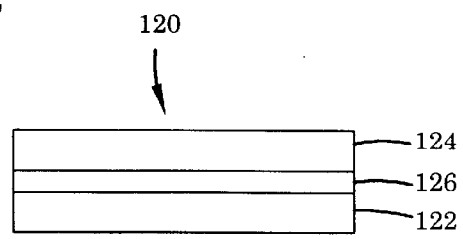
FIG. 2 is a cross-sectional view of a second embodiment of a laminated article, according to the invention.

FIG. 2 illustrates another embodiment of a laminated article 120 having a laminating adhesive layer 126 disposed between at least a portion of a support scrim 124 and a membrane 122. The laminating adhesive layer 126 may include any of a variety of temporary or permanent adhesives including, for example, thermoplastic resins, thermosetting resins, cements, contact adhesives, and pressure sensitive adhesives.

Oleophobic Enhancement Agent

Returning to FIG. 1, both the support scrim 22 and the membrane 24 are treated using an oleophobic enhancement agent in an organic solvent to increase the oleophobicity of the laminated article 20. Suitable oleophobic enhancement agents include fluoropolymers. A variety of fluoropolymers are used or are known to be useful for treating fabrics. These known fluoropolymers are also generally useful for treating the support scrim 22 and expanded PTFE membrane 24 to increase oleophobicity.

Examples of useful fluoropolymers include those having a fluoroalkyl portion or, preferably, a perfluoroalkyl portion. These fluoropolymers include, for example, fluoroalkyl esters, fluoroalkyl ethers, fluoroalkyl amides, and fluoroalkyl urethanes. Often, the fluoroalkyl and/or perfluoroalkyl portion extends from a backbone of the polymer.

The fluoropolymers may include a variety of monomer units. Exemplary monomer units include, for example, fluoroalkyl acrylates, fluoroalkyl methacrylates, fluoroalkyl aryl urethanes, fluoroalkyl allyl urethanes, fluoroalkyl maleic acid esters, fluoroalkyl urethane acrylates, fluoroalkyl amides, fluoroalkyl sulfonamide acrylates and the like. The fluoropolymers may optionally have additional non-fluoro monomer units including, for example, unsaturated hydrocarbons (e.g., olefins), acrylates, and methacrylates. Additional examples of suitable fluoropolymers are provided in U.S. Pat. No. 3,341,497, incorporated herein by reference.

An exemplary, commercially-available fluoropolymer solution is FC-3537 from 3M Co. (St. Paul, Minn.). This solution contains 25 wt. % fluoropolymer, 57 wt. % heptane, and 18 wt. % ethyl acetate. The amount of fluoropolymer can be reduced by dilution using, for example, heptane (or another alkane), ethyl acetate, methyl isobutyl ketone, or other solvents. Another exemplary, commercially-available fluoropolymer solution is FX-3539 from 3M Co. (St. Paul, Minn.). This polymer is dissolved in 9 wt. % dioctyladipate and 61 wt. % methyl isobutyl ketone and contains 30 wt. % solids.

Other exemplary, commercially-available fluoropolymers are provided in aqueous emulsions. Examples of these fluoropolymers include FC-824, FC-808, and FC-280 from 3M Co. (St. Paul, Minn.) and Zonyl 9123 (E.I. duPont de Nemours, Wilmington, Del.). The fluoropolymers can be extracted from the aqueous emulsion by removal of the water carrier. The fluoropolymers can then be solvated in an organic solvent. For example, the fluoropolymer of FC-824 or Zonyl 9123 can be solvated in methyl isobutyl ketone or other solvents after removal of the water. To facilitate the solvation of the fluoropolymer, a compound, such as acetone, can be optionally added to the aqueous emulsion to break the emulsion. In addition, the particles of fluoropolymer can be optionally ground, subsequent to removal of water to make solvation easier and quicker.

Organic Solvents for the Oleophobic Enhancement Agent

A variety of organic solvents can be used in the solution containing the oleophobic enhancement agent. Typically, the term "organic solvent" refers to non-aqueous solvents and combinations of non-aqueous solvents, and, in particular, to solvents comprising organic compounds. As used herein, a material is "dissolved in an organic solvent" if 100 wt. % of the material is dissolved in the organic solvent, unless otherwise indicated.

In many preferred embodiments, the oleophobic enhancement agent is dissolved in the organic solvent. In other embodiments, the oleophobic enhancement agent is not fully dissolved into the organic solvent. In these embodiments, a portion of the oleophobic enhancement agent may remain out of solution or may be dispersed or dissolved in an aqueous solvent. Typically, at least 50 wt. % of the oleophobic enhancement agent is dissolved in the organic solvent, preferably, at least 75 wt. % of the oleophobic enhancement agent is dissolved in the organic solvent, more preferably, at least 90 wt. % of the oleophobic enhancement agent is dissolved in the organic solvent, and, most preferably, at least 95 wt. % of the oleophobic enhancement agent is dissolved in the organic solvent. In these embodiments, the non-dissolved oleophobic enhancement agent may optionally be removed from the solution.

In many preferred embodiments, the solution of the oleophobic enhancement agent and organic solvent does not include water. In other embodiments, the solution may inadvertently or purposefully include water, however, at least a portion of the oleophobic enhancement agent is dissolved in the organic solvent. In these embodiments, preferably, at least 75 wt. %, more preferably, at least 90 wt. %, and, most preferably, at least 95 wt. %, of the oleophobic enhancement agent is dissolved in the organic solvent. In these embodiments, the solution contains no more than 50 wt. % of water, preferably, no more than 75 wt. % of water, more preferably, no more than 90 wt. % of water, and, most preferably, no more than 95 wt. % or water.

Suitable organic solvents include, for example, alkanes, ketones, esters, ethers, alcohols, and the like, as well as combinations of these solvents. Suitable organic solvents include, for example, heptane, ethylacetate, butylacetate, isoamylacetate, dioctyladipate, acetone, methyl ethyl ketone, methyl isobutyl ketone, isopropanol, diethylether, mineral spirits, petroleum distillate (b.p. 100–140° C.), and combinations thereof. A choice of solvent or solvents may be affected by a variety of factors including solubility of the fluoropolymer, boiling point of the solvent, molecular weight of the solvent, and polarity of the solvent or solvent combination.

For example, the boiling point of a suitable solvent is typically below the melting point of the treated support scrim 24 and/or membrane 24 and, preferably, below a temperature at which the treated support scrim 24 and/or membrane 24 softens, particularly, if the solvent is to be removed by heating after treatment of the layers of the laminated article 20. For some embodiments, particularly those embodiments with polyethylene or polypropylene support scrims and/or membranes, the boiling point of the solvent is typically below about 130° C., and preferably ranges from about 30° C. to about 125° C., and, more preferably, from about 40° C. to 110° C.

In some embodiments, the solvent or combination of solvents is chosen to have a relatively high vapor pressure, to facilitate removal by air drying or heating. In these embodiments, the vapor pressure at 20° C. of the solvent or combination of solvents is 1 kPa or more, preferably, 3 kPa or more, and, more preferably, 5 kPa or more.

The amount of fluoropolymer in the solution may vary over a wide range. Typically, the amount of fluoropolymer in the solution affects the oleophobicity of the final product. In some cases, however, a large amount of fluoropolymer deposited on the support scrim 24 and/or membrane 22 can block the pores in these layers. Typically, the amount of fluoropolymer in the solution is about 25 wt. % or less, preferably, about 10 wt. % or less, and, more preferably, about 5 wt. % or less. To provide adequate coverage, the amount of fluoropolymer in the solution is typically about 0.01 wt. % or more, preferably, about 0.05 wt. % or more, and, more preferably, about 0.1 wt. % or more. For many filter applications, the amount of fluoropolymer in the organic solvent ranges from about 0.01 wt. % to about 5 wt. %, preferably, from about 0.05 wt. % to about 3 wt. %, and, more preferably, from about 0.1 to about 2 wt. % of the solution.

Oleophobic Treatment

The support scrim 24 and membrane 22 may be treated with the oleophobic enhancement agent separately prior to lamination. Preferably, both the support scrim 24 and membrane 22 are treated together subsequent to lamination of the support scrim 24 and membrane 22. Typically, during treatment, the fluoropolymer solution wets and, preferably, saturates, the support scrim 24 and membrane 22. The solvent is then removed, for example, by air drying or heating. The oleophobic enhancement agent couples to the support scrim 24 and/or membrane 22 and typically imparts oleophobicity to the layer(s).

Optionally, the treated laminated article may be "cured" by heating. Although no theory is necessary to the invention, this "curing" process is believe to increase the oleophobicity by allowing rearrangement of the fluoropolymer into a preferred oleophobic orientation. The curing temperature varies among fluoropolymers, but typically ranges from about 40° C. to about 140° C., preferably, from about 50° C. to about 130° C., and, more preferably, from about 70° C. and about 125° C.

After treatment and removal of the solvent, the laminated article 20 usually has an increased oleophobicity. Typically the oleophobic rating of the laminated article 20 is at least 1, usually, at least 2, preferably, at least 4, more preferably, at least 6, and, most preferably, at least 8, as measured using AATCC test 118-1992. Typically, the treated laminated article has an increase of at least 1 rating point above a similar untreated laminated article. Preferably, the increase in oleophobic rating is at least 2 rating points, more preferably, at least 4 rating points, even more preferably, at least 6 rating points, and, most preferably, 8 rating points.

The use of an organic solvent facilitates the distribution of the fluoropolymer throughout the support scrim 24 and/or membrane 22. Many polymeric films, and, in particular, PTFE films, are not initially oleophobic and may be oleophilic. Thus, using of an organic solvent often reduces difficulties in wetting and/or saturating the support scrim 24 and membrane 22 with the oleophobic enhancement agent solution.

Known Oleophobic Treatments

Known oleophobic treatments for expanded PTFE membranes use an aqueous emulsion of fluoropolymer particles. Expanded PTFE membranes are typically hydrophobic. This suggests that wetting and saturating the support scrim 24 and/or membrane 22 using an aqueous emulsion may be difficult and could result in a non-uniform coverage of the support scrim 24 and/or membrane 22.

Moreover, expanded PTFE membranes are typically oleophilic. Thus, it is often desirable that an oleophobic treatment agent be distributed throughout the membrane to reduce the oleophilic nature of the entire membrane. Surface treatment of the membrane may not be sufficient. The hydrophobicity of the expanded PTFE membrane creates difficulties in distributing an aqueous emulsion of fluoropolymer particles throughout the membrane.

Furthermore, the preferred method of treating the membrane includes laminating the membrane to the support scrim prior to treatment (due, at least in part, to the fragile nature of typical expanded PTFE membranes). It is believed, although no theory is necessary to the invention, that if the membrane is not entirely treated with the oleophobic treatment agent, particularly at the interface between the membrane and the support scrim, oil or other contaminants may be wet into the membrane, after sufficient force is applied to overcome the oleophobically-treated support scrim, due to the membrane's inherent oleophilicity.

To treat the interface between the membrane and the support scrim using the known techniques, an oleophobic treatment agent in an aqueous emulsion must move through the support scrim and into the membrane. The hydrophobicity of the membrane suggests that this may be difficult when using an aqueous emulsion of particles. Moreover, the use of suspended particles rather than solvated molecules suggests that the particles may also be hindered when flowing through the support scrim to adhere to the membrane and when orienting to attach to the membrane. In addition, it is thought that the use of an aqueous emulsion of fluoropolymer may result in a non-uniform distribution of fluoropolymer because the fluoropolymer in an aqueous emulsion is provided in the form of particles and not uniformly distributed as in a solution.

The use of an oleophobic enhancement agent in an organic solvent, as described herein, overcomes these concerns. The expanded PTFE membrane can be wetted and saturated using organic solvents. Thus, the solvated oleophobic enhancement agent can be distributed throughout the membrane. In addition, solvation of the oleophobic enhancement agent typically provides a relatively uniform distribution of the agent throughout the membrane. Treating one or more layers of a laminated article with a fluoropolymer in an organic solvent provides a structurally different product in which the fluoropolymer is uniformly distributed over the one or more layers instead of deposited as individual particles.

Additional Examples of Laminated Articles

Figure 3:
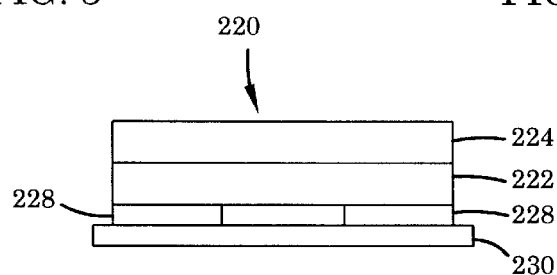
FIG. 3 is a cross-sectional view of a third embodiment of a laminated article, according to the invention.

FIG. 3 illustrates another embodiment of a laminated article 220 with a membrane 222, a support scrim 224, an adhesive layer 228 for attaching the laminated article 220 to a surface, and an optional release liner 230 to prevent the adhesive layer 228 from adhering to a surface until desired. The adhesive layer 229 can include a variety of permanent or temporary adhesives including, for example, thermoplastic resins, thermosetting resins, cements, contact adhesives, and pressure sensitive adhesives. The adhesive layer 228 can be applied to either the membrane 222 (as illustrated in FIG. 3), support scrim 224, or both or to any other layer of the laminated article. The adhesive layer 228 may cover all or only a portion of the layer or layers of the laminated article 220 to which the adhesive layer 228 is applied.

The release liner 230 is typically formed of a material laminated article 220 can be removed while retaining at least a portion, and, preferably, substantially all, of the adhesive layer 228. Suitable materials for the release layer include, for example, waxed paper products and polymeric films, such as Mylar™. In some embodiments, a release liner is not used and/or necessary.

Figure 4:
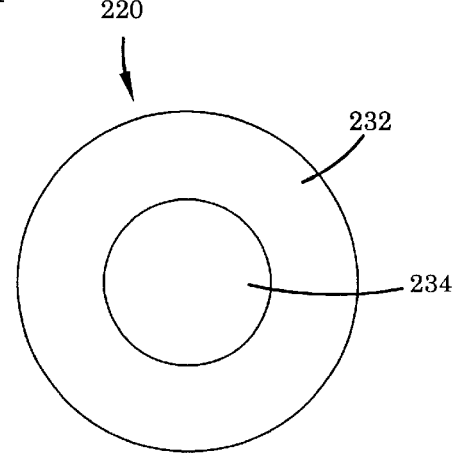
FIG. 4 is a bottom view of the laminated article of FIG. 3.

At least one embodiment of the laminated article 220 of FIG. 3 is useful, for example, as a breather filter. In this embodiment, the laminated article 220 has a portion 232 of the membrane that is covered by the adhesive layer and another portion 234 that is not covered, as shown in FIG. 4. In operation, the breather filter is placed over a port in a surface so that a portion (preferably, at least the portion 234 that is not covered by the adhesive layer) of the membrane covers the port. A fluid stream (e.g., air) may then flow through the breather filter with contaminants (e.g., particulate matter, water, and/or oily materials) being prevented or restricted from flowing through the port.

Figure 5:
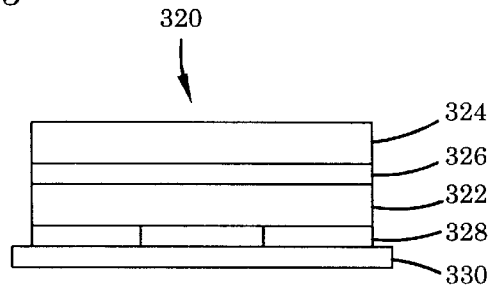
FIG. 5 is a cross-sectional view of a fourth embodiment of a laminated article, according to the invention.

FIG. 5 illustrates another embodiment of a laminated article 320 having a membrane 322 laminated to a support scrim 324 by a lamination adhesive layer 326. The laminated article 320 also includes an adhesive layer 328 to adhere the laminated article to a surface and an optional release liner 330.

Figure 6:
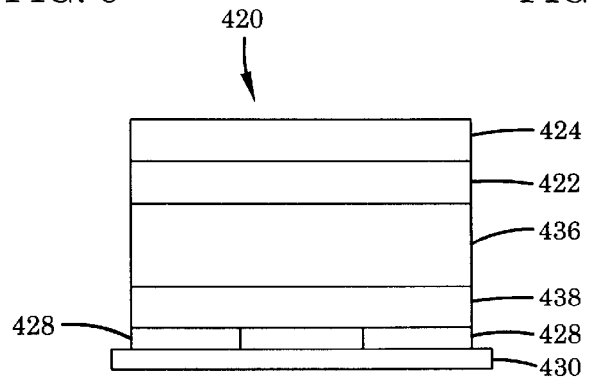
FIG. 6 is a cross-sectional view of a fifth embodiment of a laminated article, according to the invention.

FIG. 6 illustrates yet another embodiment of a laminated article 420 having a membrane 422 and a support scrim 424. The laminated article also includes an adsorbent layer 436 and an optional support layer 438, an optional adhesive layer 428, and an optional release liner 430. This laminated article 420 is suitable for use, for example, as a filter or protective film.

The adsorbent layer 436 typically adsorbs, absorbs, and/or reactively removes contaminants, such as, for example, organic molecules and water, from a fluid stream. For example, the adsorbent layer 436 may include active carbon to adsorb, absorb, or reactively remove organic molecules. The adsorbent layer 436 may, for example, include a hydrophilic material, such as a silica gel or cotton fibers, to adsorb and/or absorb water. Other adsorbent materials may also be used. The thickness of the adsorbent layer 436 often depends on the projected maximum amount of material to be absorbed.

An optional support layer 438 may be used to support the adsorbent layer 436 and/or to prevent material (e.g., carbon particles) of the adsorbent layer 438 from escaping the laminated article. The support layer 438 may be made using the same materials and methods as the support scrim 424 or the membrane 422. The support layer 438 may or may not be treated with oleophobic enhancement agent.

Figure 7:
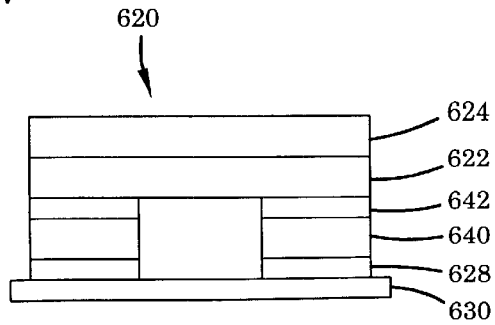
FIG. 7 is a cross-sectional view of a sixth embodiment of a laminated article, according to the invention.

FIG. 7 illustrate a further embodiment of a laminated article 620 that includes a membrane 622, a support scrim 624, an adhesive layer 628 for adhering to a surface, and an optional release liner 630. In addition, the laminated article 620 includes a stiffness-enhancing layer 640 and a second adhesive layer 642. The stiffness-enhancing layer 640 is typically made of a material that enhances the stiffness of the laminated article. Such materials include, for example, Mylar™.

In other embodiments, a support scrim of, for example, the laminated article 120 of FIG. 2, is an adsorbent layer. In other embodiments, an adsorbent layer is positioned between a support scrim and a membrane. In yet other embodiments, only one of the membrane and the support scrim is treated with the oleophobic enhancement agent.

It will also be understood that laminated articles using other membranes may also be treated in the same or similar manner to obtain a laminated article with increased oleophobicity. Examples of other membranes include polypropylene, polyethylene, polyester, and other plastic or polymeric microporous membranes, as well as polytetrafluoroethylene membranes using forms of PTFE other than-expanded PTFE. Examples of such membranes include Exxaire XBF-110W, XBF-116W, BF-303W, and BF-513K2 from Exxon Corp. (Buffalo Grove, Ill.), AP3 materials from Amoco Corp. (Atlanta, Ga.), X-7744 Porex T3 from Porex Technologies Corp. (Fairburn, Ga.), and BR-300 from Clopay Building Products Co., Inc. (Cincinnati, Ohio).

The Laminated Article used as a Filter

One application of the laminated articles, as described above, is as a filter. The filter is formed to prevent or restrict the flow of particulate matter, water, oil and/or similar molecules through the laminated article, while allowing air flow. In one embodiment, a filter of the invention has an air permeability of about 8 seconds or less, according to TAPPI T 460 om-96. Preferably, the air permeability of the filter is about 6 seconds or less, and, more preferably, about 3 seconds or less.

In one embodiment, a filter of the invention has a hydrostatic head measurement, according to ASTM D 715-95, Sections 37–41, of about 900 kPa (about 130 p.s.i.) or less. Preferably, the hydrostatic head measurement of the filter is about 630 kPa (about 90 p.s.i.) or less, and, more preferably, about 310 kPa (about 45 p.s.i.) or less.

In one embodiment, a filter of the invention has an oleophobic rating of 1 or more, as measured according to AATCC test 118-1992. Preferably, the oleophobic rating of the filter is 2 or more, more preferably, 4 or more, even more preferably, 6 or more, and, most preferably, 8 or more.

Filter Applications

Figure 8:
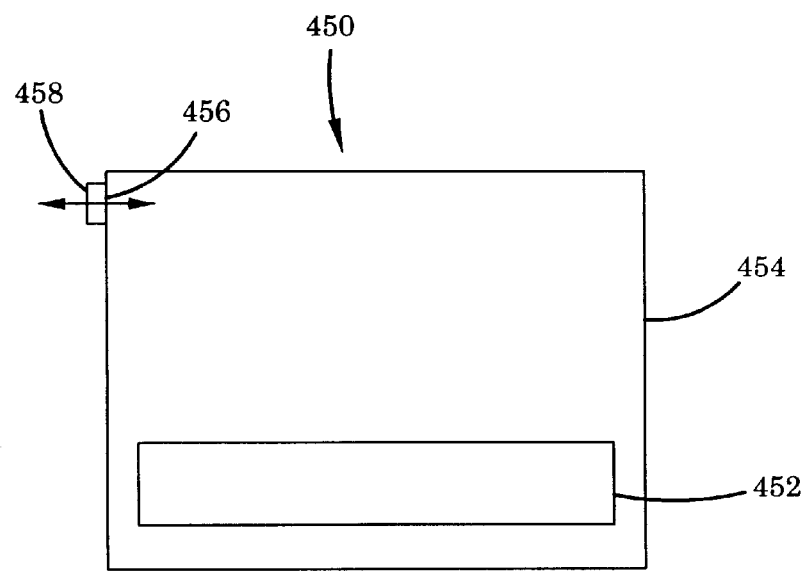
FIG. 8 is a cross-sectional view of an assembly with electronic components utilizing any of the laminated articles of FIGS. 1–7.

As an example, a laminated article of the invention could be used as a filter in an electronic device 450, as illustrated in FIG. 8. Typically, the electronic device 450 includes electronic or electrical components 452 in a housing 454. In addition, the housing 454 typically has a port 456 through which air is allowed to flow. The flow of air is often desirable to prevent air pressure differentials between the interior and exterior of the housing, for example, when the electronic or electrical components heat or cool during operation or when the electronic device is carried in the cargo hold of an airplane. Moreover, the port 456 may be used to provide air to cool the electronic or electrical components. Although, the port 456 is illustrated schematically as a direct flow-through port in the housing, it will be understood that, at least in some embodiments, the port 456 may include a tortuous, winding, or otherwise non-direct path for air flow.

To prevent the flow of contaminants, such as particulate matter, water, oil, other organic compounds, and/or other contaminants, either out of or into the housing 454, a filter 458 is provided over the port 456. The oleophobic laminated articles, as described above, are useful filters 458 in this context.

Examples of electronic devices in which the oleophobic laminated articles of the invention can be used as a filter include oil sensor, disk drives, gas sensors, optical sensors, pressure transducers, headlight breather filters, cellular phone filters, and motors.

The use of the laminated articles is not restricted to electronic devices. Other assemblies use filters to permit air flow through a port in the housing. Examples of these assemblies include sterile packaging, other packaging, medical devices, chain saw vents, ink-jet cartridges, chemical vents, anti-lock braking system (ABS) vents, and air bags.

Figure 9:
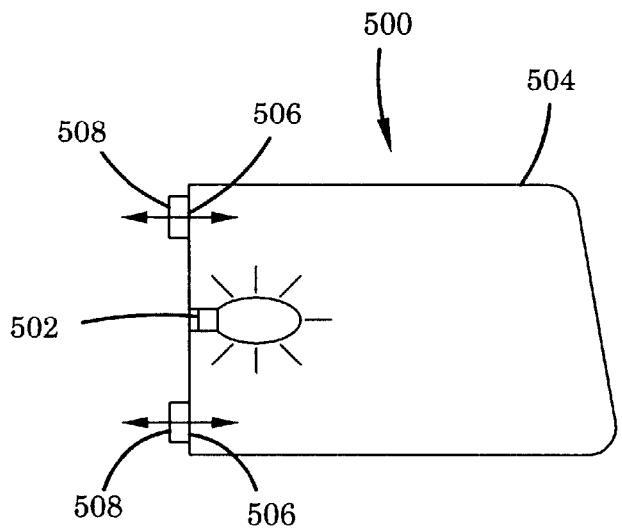
FIG. 9 is a cross-sectional view of a headlamp utilizing any of the laminated articles of FIGS. 1–7.

One application of a filter made using the laminated article of the invention is in the context of a headlamp for a vehicle, such as, for example, a car, bus, motorcycle, or truck. A headlamp 500, as illustrated in FIG. 9, includes a light source 502 and a housing 504 around the light source to protect the light source from damage and water. Pressure differentials, caused, for example, by heating or cooling of the light source 502, can damage the light source 502 if one or more ports 506 are not provided in the housing 504. Although, the one or more ports 506 are illustrated schematically as direct flow-through ports in the housing, it will be understood that, at least in some embodiments, the one or more ports 506 may include a tortuous, winding, or otherwise non-direct path for air flow.

If the ports 506 are left open then particulate matter, water, oil, and/or other contaminants can enter the housing and damage the light source or cloud the interior of the headlamp 500. Particulate matter, water, and oil are all relatively abundant in the environment of a vehicle. Thus, one or more filters 508 are placed over the ports 506 to prevent or restrict the flow of particulate matter, water, and oil into the housing 504 while allowing the flow of air. Any of the laminated articles illustrated in FIGS. 2–6 are useful as the filters 508. Preferably, the average pore size of the membrane is 1 $\mu$m or less to prevent or restrict the flow of particulate matter. The membrane is made using a hydrophobic material, preferably, expanded PTFE, to prevent or restrict the flow of water through the filters 508. In addition, the membrane and support scrim are treated with fluoropolymer solution to make the filters 508 oleophobic to prevent or restrict the flow of oil and similar molecules through the filters 508.

EXAMPLES

Example 1

Preparation of Fluoropolymer-Treated Laminated Articles.

Three laminated articles 1-A, 1-B, and 1-C were formed. A fluorocarbon polymer solution FC-3537 (3M Co., St. Paul, Minn.), containing 25 wt. % fluoropolymer in 57 wt. % heptane and 18 wt. % ethyl acetate, was diluted by the addition of heptane to form individual solutions with 0.1, 0.5, and 1.0 wt. % fluoropolymer, respectively, as shown in Table 1. Three support scrims, 1 oz. Hollytex #3257 (Ahlstrom Filtration, Inc., Mount Holly Springs, Pa.), were each laminated to one of three membranes, Tetratec #1305 expanded polytetrafluoroethylene film (Tetratec, Philadelphia, Pa.), using an adhesive, Adhesive Pur-fect Lok 34-9013 (National Starch and Chemical Corp., Bridgewater, N.J.). The laminated support scrims and membranes were then individually saturated with one of the diluted fluoropolymer solutions. The laminated layers were allowed to air dry and then cured at about 116° C. for 1 minute. The amount of fluoropolymer on the laminated article was determined using the weight of the laminated support scrim and membrane a) prior to saturation with the diluted fluoropolymer solution and b) after curing. Results are reported in Table 1.

An untreated laminated article is provided as a comparison. The untreated laminated article was formed by laminating a support scrim, 1 oz. Hollytex #3257, to a membrane, Tetratec #1305 expanded polytetrafluoroethylene film, using an adhesive, Adhesive Pur-fect Lok 34-9013.

The oleophobic rating for each laminated article was obtained using AATCC test 118-1992. The higher the rating, the better the oleophobicity. The results are reported in Table 1 and indicate that the oleophobicity of the laminated articles increases with increasing amounts of fluoropolymer in the treating solution.

The air permeability of each laminated article was also measured using TAPPI T 460 om-96. The results are reported in Table 1. Treating the laminated article has little effect on air permeability.

Example 2

Preparation of Laminated Articles with Fluoropolymer-Treated Support scrims.

Three laminated articles 2-A, 2-B, and 2-C were formed. A fluorocarbon polymer solution FC-3537 (3M Co., St. Paul, Minn.), containing 25 wt. % fluoropolymer in 57 wt. % heptane and 18 wt. % ethyl acetate, was diluted by the addition of heptane to form individual solutions with 0.1, 0.5, and 1.0 wt. % fluoropolymer, respectively, as shown in Table 2. Three different support scrims, 1 oz. Hollytex #3257 (Ahlstrom Filtration, Inc., Mount Holly Spring, Pa.), were treated with one of the three diluted fluoropolymer solutions. The support scrims were allowed to air dry and then cured at a temperature of about 116° C. for 1 minute. Each support scrim was then laminated to an individual membrane, Tetratec #1305 expanded polytetrafluoroethylene film (Tetratec, Philadelphia, Pa.), using an adhesive, Adhesive Pur-fect Lok 34-9013 (National Starch and Chemical Corp., Bridgewater, N.J.). The amount of fluoropolymer on the laminated article was determined using the weight of the support scrim and membrane a) prior to saturation of the support scrim with the diluted fluoropolymer solution and b) after lamination of the support scrim to the membrane. Results are reported in Table 2.

TABLE 1

Fluoropolymer-Treated Laminated Articles

| Laminated Article | Amount of Fluoropolymer in Diluted Treating Solution, Wt. % of Solution | Calculated Amount of Fluoropolymer in Laminated Article, Wt. % of Laminated Article | Oleophobic Rating | Permeability, Gurley seconds, 100 cc |
|---|---|---|---|---|
| Untreated | N.A. | N.A. | 0 | 2.7 |
| 1-A | 0.1 | 0.18 | 2 | 1.8 |
| 1-B | 0.5 | 0.78 | 4 | 2.2 |
| 1-C | 1.0 | 1.70 | 6 | 2.4 |

TABLE 2

Laminated Articles with Fluoropolymer-Treated Support scrims

| Laminated Article | Amount of Fluoropolymer in Diluted Treating Solution, Wt. % of Solution | Calculated Amount of Fluoropolymer on Laminated Article, Wt. % of Laminated Article | Oleophobic Rating | Permeability, Gurley seconds, 100 cc |
|---|---|---|---|---|
| Untreated | N.A. | N.A. | 0 | 2.7 |
| 2-A | 0.1 | 0.088 | 2 | 3.2 |
| 2-B | 0.5 | 0.39 | 2 | 3.1 |
| 2-C | 1.0 | 0.61 | 2 | 2.8 |

An oleophobic rating for each laminated article was obtained using AATCC test 118-1992, as described above. The results are reported in Table 1. An oleophobic rating was also measured for the support scrim prior to lamination to the membrane. The measured oleophobic rating for the support scrim of each of the treated laminated articles was 8.

The air permeability of each laminated article was also measured using TAPPI T 460 om-96. The results are reported in Table 1. Treating the laminated article has little effect on air permeability.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

I claim:

1. An article comprising:
   a treated laminate of an expanded PTFE membrane and a porous support scrim, the treated laminate resulting from
   (i) contacting a laminate of an expanded PTFE membrane and a porous support scrim with an oleophobic treatment agent dissolved in an organic solvent,
   (ii) depositing the oleophobic treatment agent onto the expanded PTFE membrane and porous support scrim, wherein depositing the oleophobic treatment agent comprises removing the organic solvent; and
   (iii) heat treating the laminate to orient the oleophobic treatment agent.

2. The article of claim 1, wherein the treated laminate further results from heat treating the laminate at a temperature greater than 70° C. to orient the oleophobic treatment agent.

3. The article of claim 1, wherein the treated laminate results from immersing a laminate of an expanded PTFE membrane and a porous support scrim in an oleophobic treatment agent dissolved in an organic solvent.

4. The article of claim 1, wherein the treated laminate results from saturating a laminate of an expanded PTFE membrane and a porous support scrim with an oleophobic treatment agent dissolved in an organic solvent.

5. The article of claim 1, wherein the treated laminate results from depositing the oleophobic treatment agent throughout the expanded PTFE membrane and porous support scrim.

6. The article of claim 1, wherein the oleophobic treatment agent comprises a fluoropolymer.

7. The article of claim 1, wherein the support scrim comprises a polymeric material.

8. The article of claim 7, wherein the polymeric material comprises polypropylene, polyethylene, polyester, or nylon.

9. The article of claim 1, wherein the support scrim and the expanded PTFE membrane are laminated together by heat.

10. The article of claim 1, further comprising an adhesive between the support scrim and the expanded PTFE membrane to laminate the support scrim and the expanded PTFE membrane together.

11. The article of claim 1, further comprising an adhesive disposed on the expanded PTFE membrane for adhering the article to a surface.

12. A filter comprising:
   a porous treated laminate of an expanded PTFE membrane and a porous support scrim, the porous treated laminate resulting from
   (i) contacting a porous laminate of an expanded PTFE membrane and a porous support scrim with an oleophobic treatment agent dissolved in an organic solvent,
   (ii) depositing the oleophobic treatment agent onto the expanded PTFE membrane and porous support scrim, wherein depositing the oleophobic treatment agent comprises removing the organic solvent; and
   (iii) heat treating the laminate to orient the oleophobic treatment agent.

13. The filter of claim 12, further comprising an adsorbent layer laminated to the expanded PTFE membrane.

14. The filter of claim 13, further comprising a support layer laminated to the adsorbent layer.

15. The filter of claim 12, further comprising adhesive disposed on the filter to adhere the filter to a surface.

16. A method of making an article having an oleophobic-treated laminate, the method comprising:
   contacting a laminate of an expanded PTFE membrane and a porous support scrim with an oleophobic treatment agent dissolved in an organic solvent,
   depositing the oleophobic treatment agent onto the expanded PTFE membrane and porous support scrim, wherein depositing the oleophobic treatment agent comprises removing the organic solvent; and
   heat treating the laminate to orient the oleophobic treatment agent.

17. The method of claim 16, further comprising heat treating the laminate to orient the oleophobic treatment agent.

18. The method of claim 16, wherein contacting a laminate comprises saturating a laminate of an expanded PTFE membrane and a porous support scrim with an oleophobic treatment agent dissolved in an organic solvent.

19. An assembly comprising:
   a housing having a port for air flow; and
   a filter disposed over the port, the filter comprising a treated laminate of an expanded PTFE membrane and a porous support scrim, the treated laminate resulting from
   (i) contacting a laminate of an expanded PTFE membrane and a porous support scrim with an oleophobic treatment agent dissolved in an organic solvent,
   (ii) depositing the oleophobic treatment agent onto the expanded PTFE membrane and porous support scrim, wherein depositing the oleophobic treatment agent comprises removing the organic solvent; and
   (iii) heat treating the laminate to orient the oleophobic treatment agent.

20. The assembly of claim 19, wherein the assembly is a headlamp and the assembly further comprises a light source disposed in the housing.

* * * * *

UNITED STATES PATENT AND TRADEMARK OFFICE
CERTIFICATE OF CORRECTION

PATENT NO. : 6,582,113 B2
DATED : June 24, 2003
INVENTOR(S) : Rogers

It is certified that error appears in the above-identified patent and that said Letters Patent is hereby corrected as shown below:

Column 10,
Line 8, "adhesive layer 229" should read -- adhesive layer 228 --

Signed and Sealed this

Thirtieth Day of December, 2003

JAMES E. ROGAN
*Director of the United States Patent and Trademark Office*